(12) United States Patent
Fukuda (10) Patent No.: US 6,169,905 B1
(45) Date of Patent: Jan. 2, 2001

(54) DIGITAL CORDLESS TELEPHONE APPARATUS

(75) Inventor: Kunio Fukuda, Tokyo (JP)

(73) Assignee: Sony Corporation, Tokyo (JP)

(*) Notice: Under 35 U.S.C. 154(b), the term of this patent shall be extended for 0 days.

(21) Appl. No.: 08/265,000

(22) Filed: Jun. 24, 1994

(30) Foreign Application Priority Data

Jun. 29, 1993 (JP) .................................................. 5-159484

(51) Int. Cl.$^7$ ...................................................... H04Q 7/20
(52) U.S. Cl. ........................ 455/462; 455/403; 455/518; 455/574
(58) Field of Search .................. 379/58, 61, 63, 379/59; 455/38.3, 127, 343, 33.1, 54.1, 56.1; 342/44; 370/95.3

(56) References Cited

U.S. PATENT DOCUMENTS

| | | | |
|---|---|---|---|
| 4,731,814 | * 3/1988 | Becker et al. | 455/127 |
| 5,014,295 | * 5/1991 | Kunihiro | 379/63 |
| 5,054,052 | * 10/1991 | Nonami | 455/343 |
| 5,140,698 | * 8/1992 | Toko | 455/343 X |
| 5,241,542 | * 8/1993 | Natarajan et al. | 370/95.3 |
| 5,285,443 | * 2/1994 | Patsiokas et al. | 379/61 |
| 5,347,562 | * 9/1994 | Candy | 379/58 |
| 5,382,949 | * 1/1995 | Mock et al. | 455/38.3 |
| 5,455,575 | * 10/1995 | Schuermann | 342/44 X |

FOREIGN PATENT DOCUMENTS

| | | | |
|---|---|---|---|
| 0375067 A1 | 6/1990 | (EP) | H04Q 7/04 |
| 0490441 A2 | 6/1992 | (EP) | H04Q 7/04 |
| 2138652 | 10/1984 | (GB) | H04Q 11/02 |

OTHER PUBLICATIONS

William Stallings, Data and Computer Communications, pp. 296, 297, 302, 303, (2d ed. 1988).*
Patent Abstracts of Japan, JP 60–052133, Published Mar. 25, 1985, Nippon Telegr. & Teleph. Corp.

* cited by examiner

Primary Examiner—William G. Trost
(74) Attorney, Agent, or Firm—Limbach & Limbach L.L.P.

(57) ABSTRACT

A method of controlling a digital cordless telephone apparatus formed of a plurality of master stations and a plurality of remote stations is provided. This method comprises the steps of making a telephone call among the master stations and the remote stations by transmitting and receiving digital data with different timings, and setting a common system access code in respective master stations so as to make a telephone call become possible among all of the master stations and the remote stations, wherein other master station receives a control signal included in the system access code transmitted from a main master station of a plurality of the master stations, a control signal from other master station is transmitted in synchronism with a reception timing of the control signal and the remote station turns on and off a power supply of its reception unit on the basis of the control signal transmitted thereto.

2 Claims, 5 Drawing Sheets

FIG. 3A
DOWN-LINK CONTROL SIGNAL FROM MASTER STATION

FIG. 3B
POWER SWITCH OF RECEPTION UNIT OF REMOTE STATION

DIGITAL CORDLESS TELEPHONE APPARATUS

BACKGROUND

1. Field of the Invention

The present invention relates to a cordless telephone apparatus and a control method thereof and, more particularly, to a digital cordless telephone apparatus in which a telephone communication is made among master stations and remote stations and a control method thereof.

2. Background of the Invention

Figure 1:
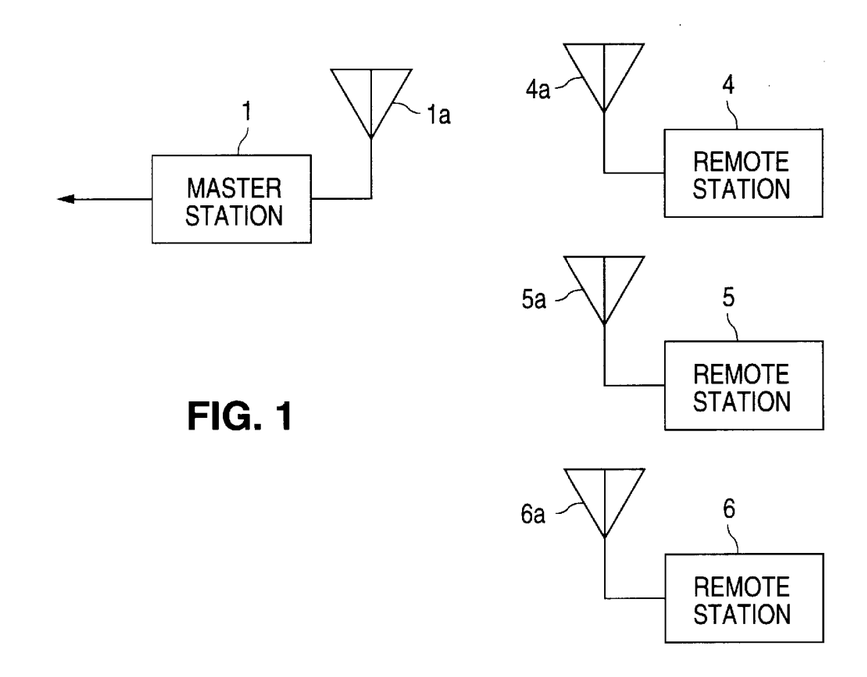
FIG. 1 is a schematic diagram showing a system arrangement of a cordless telephone apparatus which becomes a premise of the present invention.

A digital cordless telephone apparatus is arranged as shown in FIG. 1 of the accompanying drawings. As shown in FIG. 1, a master station 1 serving as a base station is connected to a telephone line network (not shown) and includes an antenna 1a to make a telephone communication between it and a remote station. As shown in FIG. 1, there are prepared a plurality of remote stations, i.e., three remote stations 4, 5 and 6 which can make a call among them and the master station 1. The remote stations 4, 5 and 6 include antennas 4a, 5a and 6a, and a radio transmission is made possible among the antenna 1a of the master station 1 and the antennas 4a, 5a, 6a of the remote stations 4, 5, 6.

When the user (telephone subscriber) makes a telephone call between each of the remote stations 4, 5 and 6 and the master station 1 or the caller connected to the master station 1 through the telephone line network (not shown), the remote station transmits a connection control signal of a predetermined format to the master station 1 side and also transmits audio data that was converted into digital data in a time division manner between it and the master station 1 to make a telephone call.

Digital cordless telephone apparatus employ the TDD system (time-division double system) or TDMA/TDD system (time-division multiplexing access/time-division double system) in which a transmitted signal and a received signal are the same in frequency and a transmission is carried out in a so-called ping-pong fashion.

Figure 2A:
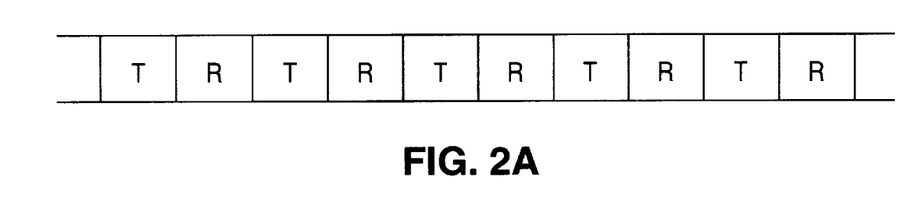
FIGS. 2A and 2B are diagrams used to explain a communication system.

In the case of the TDD system, as shown in FIG. 2A, one channel or one frequency is divided into a transmission slot T and a reception slot R from a time standpoint. The transmission slot T and the reception slot R are alternately repeated and a guard time (not shown) is provided between the transmission slot T and the reception slot R. Each of a duration of the slots T and R is set to be 1 millisecond and the guard time is set to be several 10s of microseconds. Portable telephones (remote stations) use the transmission slot T to communicate with the base station (master station) and the reception slot R to receive a signal from the base station.

Figure 2B:
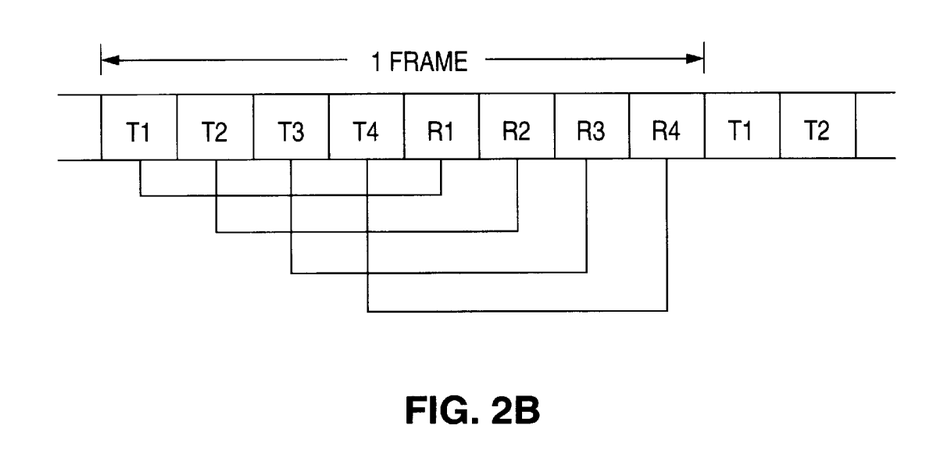

In the case of the TDMA/TDD system, as shown in FIG. 2B, when a call is made between one remote station and the master station, the transmission slot T and the reception slot R provided within one channel are used only one time per several cycles and other transmission slots T and reception slots R provided within the same channel are used to make a call between other remote station and the master station. The TDMA/TDD system multiplexes the transmission and reception in order to make a communication among a plurality of communication apparatus with one channel.

Figures 3A, 3B:
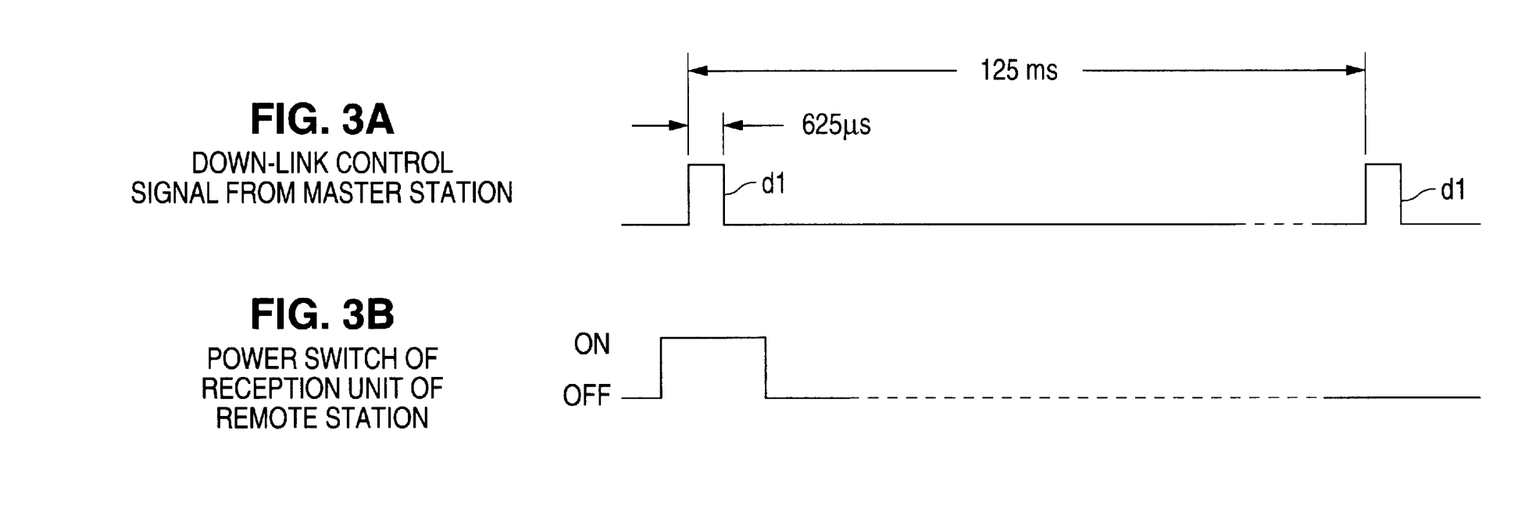
FIG. 3A is a timing chart showing a timing at which a down-link control signal transmitted from the master station is transmitted.
FIG. 3B is a timing chart showing a timing at which a power switch of the reception unit of the remote station is turned on/off.

Since the transmission and the reception are multiplexed as described above, it is possible to effectively use frequency bands prepared for the cordless telephones. When a telephone communication is made as described above, the control signal is transmitted from the master station to each remote station at every predetermined cycle in accordance with a predetermined format. As shown in FIG. 3A, for example, a control signal d1 is transmitted from the master station to the remote station at every 125 milliseconds during 625 microseconds. When any one of remote stations is accessed by the master station through some suitable means, such as an extension call or the like, the master station accesses the target remote station by transmitting an identification No. of the target remote station to the target remote station by means of the control signal Id. When each remote station is placed in the mode (referred to simply hereinafter as "reception standby mode") so as to be accessed by the control signal from the master station, if the reception unit of the remote station is intermittently energized so as to receive only the control signal at a predetermined cycle, e.g., once per 1.5 seconds as shown in FIG. 3B, then a power consumption required when the remote station is in the reception standby mode can be reduced. Fundamentally, the remote station continues receiving each control signal during 625 microseconds. However, in actual practice, considering an actuation time required when the reception unit is actuated, the reception unit of the remote station is controlled so as to receive one control signal during about 10 milliseconds per access. Assuming now that the reception unit is energized to receive one control signal during 10 milliseconds at every 1.5 seconds, for example, then a period of time in which the reception unit is operated becomes about 0.67% and therefore the power consumption can be reduced considerably as compared with that required when the reception unit continues receiving the control signal.

Figure 4:
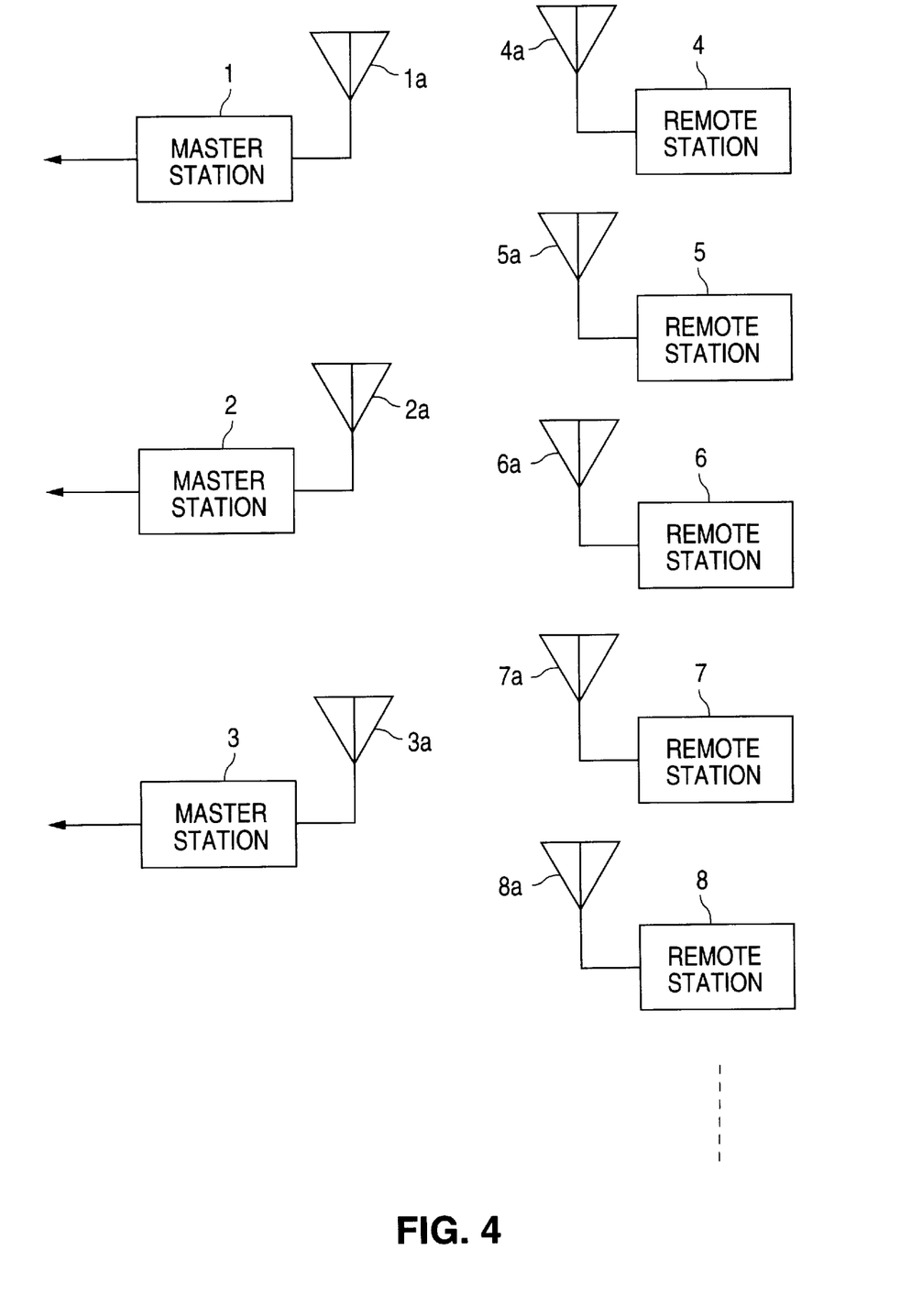
FIG. 4 is a schematic diagram showing a system arrangement of a digital cordless telephone apparatus according to an embodiment of the present invention.

As the system arrangement of such digital cordless telephone apparatus, there is known such one that includes a plurality of master stations as shown in FIG. 4. As shown in FIG. 4, cordless telephone master stations 1, 2 and 3 are connected to telephone line networks (not shown) separately and include antennas 1a, 2a and 3a to make a call among them and remote stations. Remote stations 4, 5, 6, 7, 8, . . . are prepared to communicate with the master stations 1, 2 and 3. The remote stations 4, 5, . . . , can communicate with any of the master stations 1, 2 and 3 via radio waves to make a call through any one of the master stations 1, 2 and 3. With this arrangement, each of the remote stations 4, 5, . . . , can make an outgoing call via any one of the master stations 1, 2 and 3. Also, each of the remote stations 4, 5, . . . , can answer an incoming call when any one of the master stations 1, 2 and 3 receives the incoming call, thereby the digital cordless telephone apparatus being widely used as a cordless telephone.

Insofar as the remote station can make a call between it and a plurality of master stations, each remote station should receive control signals transmitted from all master stations in its reception standby mode so that the remote station cannot receive the control signal at a predetermined interval in the above-mentioned reception standby mode. Thus, it is impossible to reduce the power consumed required when the remote station is set in the reception standby mode. Specifically, there is the possibility that each of the remote stations 4, 5, . . . , will be accessed by all control signals transmitted from all master stations 1, 2 and 3. Therefore, each remote station should receive all control signals, such as a control signal transmitted from the first master station 1, a control signal transmitted from the second master station 2 and a control signal transmitted from the third master station 3. The master stations 1, 2 and 3 transmit the control signals cyclically but the control signals transmitted from the three master stations 1, 2 and 3 are perfectly different from one another. Consequently, a time required when the reception unit of each of the remote stations 4, 5, . . . is energized must be extended considerably such that the remote stations 4, 5, can receive the control signal transmitted from any master station in their reception standby modes.

Alternatively, if timings at which the control signals are transmitted from all the master stations 1, 2 and 3, then it is possible to energize the reception unit of each of the remote stations 4, 5, . . . , during a period of each of the detected transmission timings. In this case, however, as compared with the case that the reception unit of each remote station is energized at the timing of the control signal transmitted from the single master station as shown in FIGS. 3A and 3B, the reception unit of the remote station is turned on and off three times when there are prepared three master stations. Thus, the control operation for turning on/off the reception unit becomes complex.

SUMMARY OF THE INVENTION

It is, therefore, an object of the present invention to provide a digital cordless telephone apparatus in which the above-mentioned problems can be solved.

It is another object of the present invention to provide a method of controlling a digital cordless telephone apparatus in which the above-mentioned problems can be solved.

It is a further object of the present invention to provide a method of controlling a reception standby operation of a remote station in a digital cordless telephone apparatus in which the above-mentioned problems can be solved.

According to a first aspect of the present invention, there is provided a method of controlling a digital cordless telephone apparatus formed of a plurality of master stations and a plurality of remote stations. This method is comprised of the steps of making a telephone call among the master stations and the remote stations by transmitting and receiving digital data with different timings and setting a common system access code in respective master stations so as to make a telephone call become possible among all of the master stations and the remote stations, wherein other master station receives a control signal included in the system access code transmitted from a main master station of a plurality of the master stations and a control signal of other master station is transmitted in synchronism with a reception timing of the control signal.

According to a second aspect of the present invention, there is provided a digital cordless telephone apparatus which is comprised of a plurality of remote stations and a plurality of master stations. A common system access code is set in a plurality of master stations so as to make a telephone call become possible among all of the master stations and the remote stations. Other master station receives a control signal included in the system access code transmitted thereto from a main master station of a plurality of the master stations and a control signal is transmitted from other master station in synchronism with a reception timing of the control signal. The remote station turns on and off a power supply of its reception unit on the basis of the control signal.

According to a third aspect of the present invention, there is provided a method of controlling a reception standby operation of a remote station in a digital cordless telephone apparatus. The digital cordless telephone apparatus comprises a plurality of master stations and a plurality of remote stations in which a telephone call is made among the master stations and the remote stations by transmitting and receiving digital data with different timings and a common system access code is set in respective master stations so as to make a telephone call become possible among all of the master stations and the remote stations. The method of controlling a reception standby operation of a remote station in a digital cordless telephone apparatus is characterized in that other master station receives a control signal included in the system access code transmitted thereto from a main master station of a plurality of the master stations, a control signal of other master station is transmitted in synchronism with a reception timing of the control signal and that the remote station turns on a power supply of its reception unit on the basis of the control signal.

According to the present invention, since other master station transmits the control signal on the basis of the control signal transmitted thereto from the main master station, the control signals are constantly transmitted from other master stations at the constant timing without synchronizing the master stations by directly connecting the master stations with signal lines or the like. Therefore, if the respective remote stations cause the reception units to receive the control signals at the constant timing, then the remote stations can receive the control signals from all of the master stations, thereby making it possible to considerably reduce a time required when the reception units are operated during the reception standby mode of the remote stations.

BRIEF DESCRIPTION OF THE DRAWINGS

The invention will be more readily understood with reference to the accompanying drawings, wherein:

FIGS. 3A and 3B are timing charts showing the state that the control signal of the system shown in FIG. 1 is transmitted and received, in which:

FIGS. 9A through 9D are timing charts showing timings of transmission and reception states of control signals, in which:

DESCRIPTION OF THE INVENTION

A digital cordless telephone apparatus according to an embodiment of the present invention will be described in detail below with reference to the drawings.

In this embodiment, the present invention is applied to the digital cordless telephone apparatus of the TDMA/TDD system similarly to the example shown in FIG. 1.

Initially, the system arrangement of this digital cordless telephone apparatus will be described with reference to FIG. 4. In FIG. 4, like parts corresponding to those of FIG. 1 are marked with the same references and therefore need not be described in detail. According to the embodiment of the present invention, this digital cordless telephone apparatus includes three master stations 1, 2 and 3. The first, second and third master stations 1, 2 and 3 are connected to a telephone line network (not shown) separately and includes the antennas 1a, 2a, and 3a to make a call among them and the master stations 1, 2 and 3. This digital cordless telephone apparatus further includes a plurality of remote stations 4, 5, 6, 7, 8, . . . which can communicate with the master stations 1, 2 and 3. The remote stations 4, 5, . . . , include the antennas 4a, 5a, . . . , to make a telephone communication among them and the master stations or other remote stations. The remote stations 4, 5, . . . , can make a call among them and all of the master stations 1, 2 and 3 via radio waves and make a call via all master stations.

Figure 5:
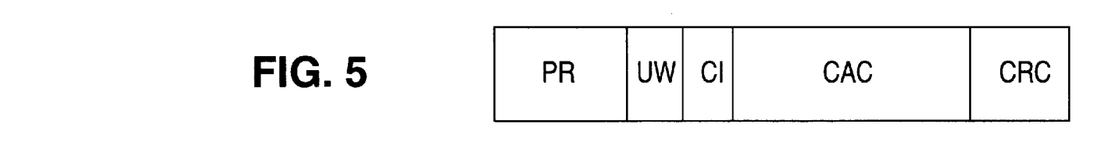
FIG. 5 is a diagram used to explain a format of a control signal according to the present invention.
Figure 6:
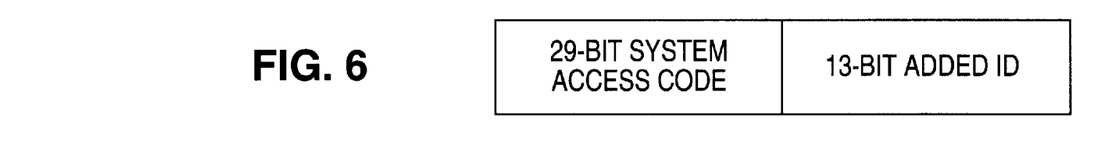
FIG. 6 is a diagram used to explain a format of an identification code according to the present invention.

A common system access code is set in the master stations 1, 2 and 3. The common system access code is added to the control signals transmitted from the master stations 1, 2 and 3. It is determined by the common system access code whether or not the remote stations are commonly used by the master stations. The common system access code will be described below. A down-link control signal transmitted from each of the master stations 1, 2 and 3 is arranged as shown in FIG. 5. As shown in FIG. 5, the down-link control signal comprises a preamble PR which is a sync word formed of a constant pattern of a predetermined length, a unique word UW of a specific pattern indicative of the control signal, a channel type C1 for effecting a communication, control data CAC indicating a control content and an error-detection parity CRC, in that order.

An identification (ID) code is transmitted by using predetermined bits of the control data CAC. The identification code comprises a first half of 29 bits to transmit the system access code and a second half of 13 bits to transmit an added ID. The added ID is set in each of the master stations 1, 2 and 3. One control signal shown in FIG. 5 is transmitted at the cycle of 625 microseconds.

In this embodiment, the first master station 1 in the three master stations 1, 2, 3 thus prepared will be referred to hereinafter as "main master station 1", and the remaining master stations 2 and 3 will be referred to hereinafter as "sub master stations 2 and 3". The sub master stations 2 and 3 receive the control signal transmitted from the main master station 1. The sub master stations 2 and 3 transmit control signals in synchronism with the timing at which the sub master stations 2 and 3 receive the control signal from the main master station 1. Operation for controlling this transmission timing will be described specifically later on.

Figure 7:
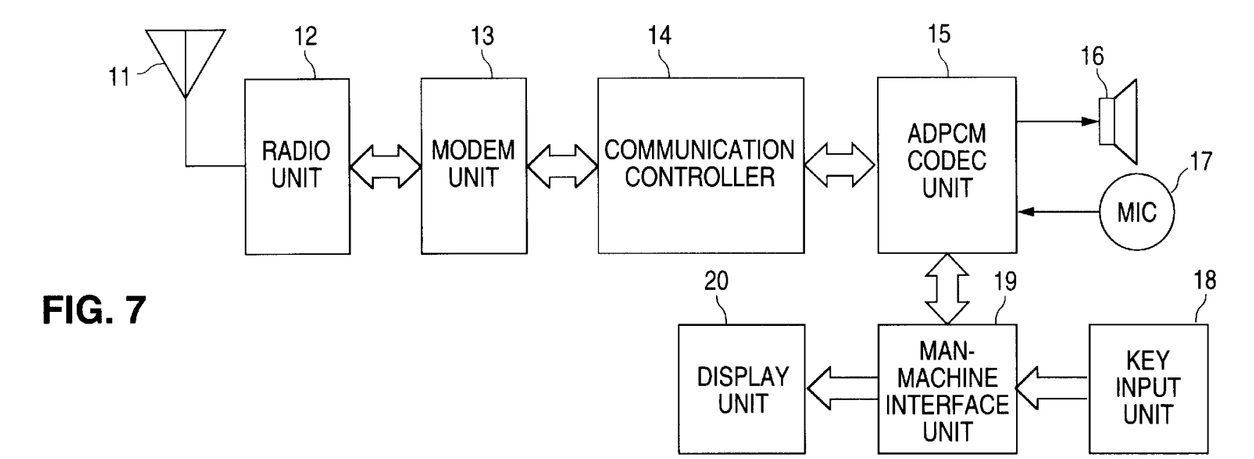
FIG. 7 is a block diagram showing an arrangement of a remote station according to the present invention.

FIG. 7 shows the arrangement of the remote stations 4, 5, . . . which are for use with the cordless telephone according to the embodiment of the present invention. As shown in FIG. 7, data received at an antenna 11 from the master station or other remote station is processed by a radio unit 12 and fed to a MODEM (modulator and demodulator) unit 13, in which received data is demodulated. Received data thus demodulated is supplied through a communication controller 14 to an ADPCM CODEC (coder/decoder) unit 15, in which ADPCM digital data output from the communication controller 14 is converted into an analog audio signal. The analog audio signal is then acoustically transduced into sounds by a speaker 16, and sounds are emanated from the speaker 16.

An analog audio signal output from a microphone 17 is supplied to the ADPCM CODEC unit 15, in which it is converted into ADPCM digital data. The digital data thus converted is supplied through the communication controller 14 to the MODEM unit 13, in which it is modulated to transmission data. The modulated data is transmitted from the antenna 11 connected to the radio unit 12.

A key input unit 18 is connected to the ADPCM CODEC unit 15 through a man-machine interface unit 19 and information entered by the key input unit 18 is supplied to the communication controller 14. Further, a display unit 20 is connected to the man-machine interface unit 19 and the status of the digital cordless telephone, such as operation state or the like, is displayed on the display unit 20.

The communication controller 14 controls the remote station such that the remote station receives only the control signal transmitted through a predetermined control channel from the master station at a predetermined interval when the remote station is in the reception standby mode. The communication controller 14 determines by identifying the system access code included in the control signal whether the transmitted control signal is the control signal of the system to which this remote station belongs or not. The remote station determines the control signal transmitted from the main master station 1 on the basis of the added ID transmitted following the system access code, and receives the control signal cyclically at the predetermined interval on the basis of the reception timing of the control signal from the main master station 1. The reception processing of the remote station will be described later on.

If the received control signal is the control signal of the system to which the remote station belong, then the remote station discriminates the content of the control signal thus received. When the remote station determines that it is accessed by the connection request signal included in the control signal, this remote station perform a predetermined operation on the basis of the content of the determined control signal. When the remote stations are respectively accessed by the connection request signal, they are communicated with the master station in order to answer the extension call or the incoming call or they are communicated with each other for extension call. When the user makes a call for answering the incoming call or the extension call, i.e., extension call with the master station and a telephone call between the remote stations by using each remote station, the remote station transmits the connection request signal to the master station by using the control channel.

Figure 8:
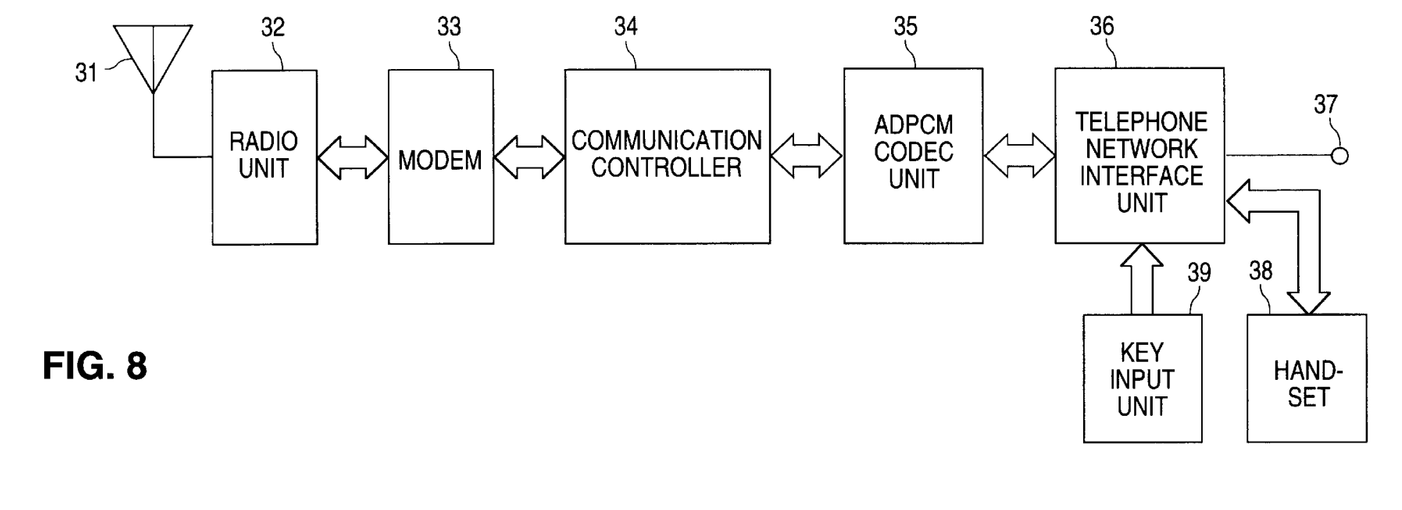
FIG. 8 is a block diagram showing an arrangement of a master station according to the present invention.

An arrangement of each of the master stations 1, 2 and 3 will be described below. The main master station 1 and the sub master stations 2, 3 are the same in arrangement and constructed as shown in FIG. 8. Similarly to the remote station, as shown in FIG. 8, data received at an antenna 31 from the remote station is received by a radio unit 32 and supplied to a MODEM unit 33, in which received data is demodulated. The received data thus demodulated by the MODEM unit 33 is supplied through a communication controller 34 to an ADPCM CODEC unit 35. The ADPCM digital data is converted by the ADPCM CODEC unit 35 into an analog audio signal. The analog audio signal is supplied to a telephone network interface unit 36 and then output to an analog telephone line network connection terminal 37.

An analog audio signal obtained at the analog line network connection terminal 37 is supplied through the telephone network interface unit 36 to the ADPCM CODEC unit 35, in which it is converted into ADPCM digital data. The digital data thus converted is supplied through the communication controller 34 to the MODEM unit 33, in which it is modulated into transmission data. The data thus modulated is transmitted from the antenna 31 connected to the radio unit 32.

A handset 38 is directly connected to the telephone network interface unit 36 so that the user can answer an incoming call with the handset 38 via the analog telephone line network connection terminal 37 and that the user can communicate with extension call made by other remote station via the ADPCM CODEC unit 35. Moreover, a key input unit 39 is connected to the telephone network interface unit 36 so that the user can perform various control operation, such as to make an outgoing call or the like.

The communication controller 34 of this master station transmits a control signal at a predetermined interval by using a channel (frequency band) exclusively prepared when to transmit the control signal. The master station accesses other remote stations by using this control signal. The control signal transmitted from each master station is added with the same system access code. Also, it is determined by the added ID transmitted following the system access code whether the control signal is the control signal from the main master station or the control signal from the sub master station.

In this embodiment, the communication controller 34 of the sub master stations 2 and 3 control respective units so as to receive the control signal from the main master station 1. Specifically, the sub master stations 2 and 3 receive the control signal including the system access code having the master ID added thereto and discriminate the added ID. The communication controller 34 controls the respective sub master stations such that the sub master stations 2, 3 transmit the control signals cyclically in synchronism with the timing at which they receive the control signal from the main master station 1. In this embodiment, the transmission operations of the control signals from the sub master stations 2 and 3 are synchronized on the basis of the timing at which the preamble serving as the sync word which is the first signal transmitted as the control signal is transmitted.

The states that the control signals are transmitted from the respective master stations 1, 2 and 3 will be described below.

Figure 9A:
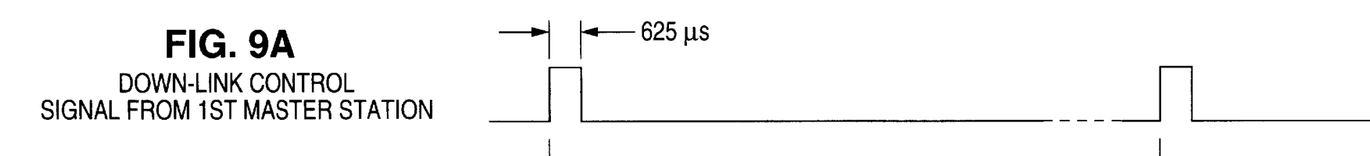
FIG. 9A shows a timing at which a down-link control signal transmitted from a first master station which becomes a main master station is transmitted.

The main master station 1 transmits the control signal under the condition that the remote stations are set in the reception standby mode as shown in FIG. 9A. Specifically, the main master station 1 successively transmits the control signal of 625 microseconds at the cycle of 125 milliseconds. A period in which the waveform rises as shown in FIG. 9A is the period in which the control signal is transmitted.

Figure 9B:
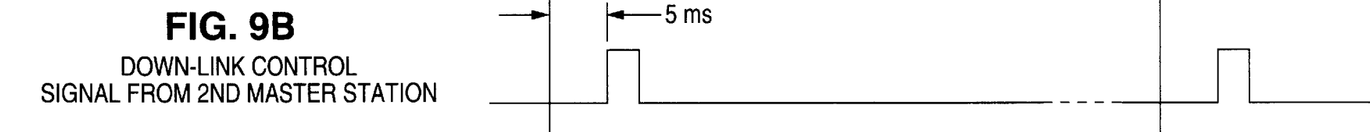
FIGS. 9B and 9C show timings at which a down-link control signal transmitted from a second master station which becomes a sub master station is transmitted.
Figure 9C:
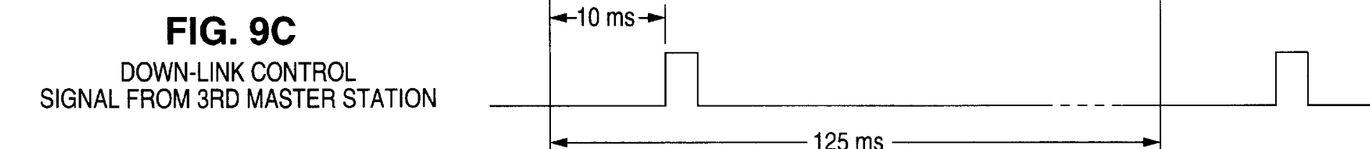

The sub master stations 2, 3 receive the control signals transmitted from the main master station 1 and transmits the control signal in synchronism with the reception timing of the control signals from the sub master stations 2, 3. The second master station 2 transmits the control signal after 5 milliseconds since it received the control signal from the first master station 1 as shown in FIG. 9B. Also, the third master station 3 transmits the control signal after receiving the control signal from the first master station 1 as shown in FIG. 9C. Accordingly, during the period of [10 milliseconds+625 microseconds], the control signals are successively transmitted from the three master stations 1, 2 and 3.

Figure 9D:
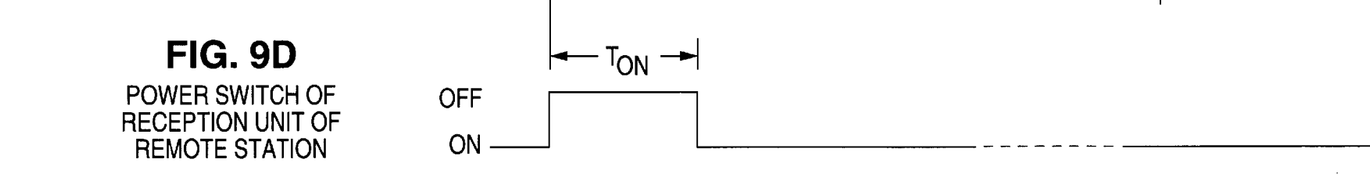
FIG. 9D shows a timing at which the power switch of the reception unit of the remote station is turned on/off.

In the reception standby mode of each of the remote stations 4, 5, . . . , the remote stations 4, 5, . . . , energize their reception units (radio units 12 or the like) only during the period of the timing at which a series of control signals is successively transmitted. As shown in FIG. 9D, the power supply of the reception unit is turned on only during a period $T_{ON}$ in which the transmission of the control signal from the third master station 3 is ended since the transmission of the control signal from the first (main) master station 1 was started. Since however a very short time, e.g., 25 microseconds is needed when the reception unit of the remote station is actuated in actual practice, the period $T_{ON}$ in which the reception unit is energized becomes equal to a time in which the actuation time of about 25 microseconds is added to the above-mentioned period of [10 milliseconds+625 microseconds].

In order for the remote stations 4, 5, . . . , to effect the above-mentioned control operations, the remote stations 4, 5, . . . , detect the timing at which they receive the control signal transmitted from the main master station 1 and receive the transmitted control signal intermittently during the period $T_{ON}$ on the basis of the detected timing. The reception operation in this period $T_{ON}$ is intermittently carried out at a predetermined cycle. The cycle in which the reception operation is intermittently carried out during the period $T_{ON}$ may be an integral multiple of 125 milliseconds because the cycle in which the control signal is transmitted is 125 milliseconds. When the same control signal is repeatedly transmitted from the master stations 1, 2 and 3 over the period of 1.5 seconds, for example, the reception cycle in the remote station may be set to 1.5 seconds.

With the above-mentioned control operation, the operation time required when the remote stations 4, 5, . . . , are in the reception standby mode can be reduced considerably. Specifically, according to this embodiment, the control signals from a plurality of master stations 1, 2, 3 should be received by the remote stations 4, 5, . . . However, the power supply of the circuit, such as the radio unit 12 or the like necessary for the reception, need not be set in the on-state constantly but may be turned on at every predetermined cycle during the above-mentioned period $T_{ON}$, thereby the power consumption needed in the reception standby mode of the remote stations being reduced considerably. For example, a reduction ratio R with which the power consumption is reduced when the reception cycle is set as described above and the on-period is set as described above, i.e., the reception cycle is 1.5 seconds and the period $T_{ON}$ is equal to (10 milliseconds+625 microseconds+25 microseconds) is given by the following equation:

$$R=(10+0.625;\ 0.025)/1.5\times10^3=7.1\times10^{-3}$$

Study of the above-mentioned equation reveals that the power supply of the reception unit is energized during the period of about 0.7%. As described above, as compared with the case that the control signal is constantly received, the power consumption can be reduced considerably according to the present invention. According to the present invention, in the cordless telephone having a plurality of master stations, the power consumption required when the remote stations are in the reception standby mode can be reduced substantially similarly to a cordless telephone having a single master station. Since the power consumption required in the reception standby mode of the remote stations can be reduced, a duration of a battery incorporated in each remote station can be extended. Since the number in which the reception unit is turned on/off can be reduced as compared with the case that the remote stations are synchronized with a plurality of master stations independently, the control operation of the remote station in the reception standby mode can be simplified. Furthermore, according to this embodiment, since a plurality of master stations 1, 2 and 3 need not be directly connected by means of signal lines so as to become synchronized with each other, the control signals may be received by the sub master stations 2 and 3. Therefore, it is possible to simplify a wiring work required when the cordless telephone having a plurality of master station is installed.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A method of transmitting control signals between a master station, a plurality of sub-master stations, and a plurality of remote stations, the method comprising the steps of:

periodically transmitting a master control signal from the master station to the sub-master stations and the remote stations over a channel, the master control signal having a leading edge and a trailing edge;

transmitting a plurality of sub-master control signals from the sub-master stations to the remote stations in response to each master control signal a predefined time after the trailing edge of each master control signal is transmitted so that none of the sub-master control signals are output at the same time, the sub-master control signals each having a leading edge and a trailing edge, a transmission interval being defined from the leading edge of one of the master control signals to the trailing edge of a last sub-master control signal to be transmitted in response to said one of the master control signals; and receiving the master and sub-master control signals at the remote stations, determining the periodicity of the transmission interval at the remote stations, de-energizing a reception unit in each of the remote stations after the periodicity of the transmission interval has been determined, and energizing the reception unit only during every n transmission intervals to receive the master and sub-master control signals over the channel, where n is an integer.

2. A digital cordless telephone apparatus comprising:

a master station that periodically transmits a master control signal over a channel, the master control signal having a leading edge and a trailing edge;

a plurality of sub-master stations, each sub-master station transmitting a sub-master control signal in response to each received master control signal a predefined time after receiving the trailing edge of each master control signal so that none of the sub-master control signals are output at the same time, each sub-master control signal having a leading edge and a trailing edge, a transmission interval being defined from the leading edge of one of the master control signals to the trailing edge of the sub-master control signal that is last to be transmitted in response to said one of the master control signals; and a plurality of remote stations, each remote station receiving the master and sub-master control signals, determining the periodicity of the transmission interval, de-energizing a reception unit after the periodicity of the transmission interval has been determined, and energizing the reception unit only during every n transmission intervals to receive the master and sub-master control signals over the channel, where n is an integer.

* * * * *